United States Patent
Liu et al.

(10) Patent No.: US 9,702,706 B2
(45) Date of Patent: Jul. 11, 2017

(54) FACILITY WAYFINDING SYSTEM

(71) Applicant: MAPPEDIN INC., Kitchener (CA)

(72) Inventors: Hongwei Liu, Ottawa (CA); Leander Lee, Brampton (CA); Mitchell Butler, Halifax (CA)

(73) Assignee: MAPPEDIN INC., Kitchener (CA)

( * ) Notice: Subject to any disclaimer, the term of this patent is extended or adjusted under 35 U.S.C. 154(b) by 829 days.

(21) Appl. No.: 13/852,304

(22) Filed: Mar. 28, 2013

(65) Prior Publication Data

US 2014/0156186 A1 Jun. 5, 2014

Related U.S. Application Data

(60) Provisional application No. 61/733,078, filed on Dec. 4, 2012.

(51) Int. Cl.
*G01C 21/20* (2006.01)
*G06Q 30/02* (2012.01)

(52) U.S. Cl.
CPC ....... *G01C 21/206* (2013.01); *G06Q 30/0259* (2013.01); *G06Q 30/0261* (2013.01)

(58) Field of Classification Search
CPC ............. G01C 21/206; G06Q 30/0261; G06Q 30/0259
See application file for complete search history.

(56) References Cited

U.S. PATENT DOCUMENTS

| | | | |
|---|---|---|---|
| 8,254,961 B2 | 8/2012 | Moon et al. | |
| 8,259,692 B2 | 9/2012 | Bajko | |
| 8,320,939 B1 | 11/2012 | Vincent | |
| 8,350,758 B1 | 1/2013 | Parvizi et al. | |
| 8,712,688 B2 * | 4/2014 | Forte et al. | 701/516 |
| 2006/0247849 A1 | 11/2006 | Mohsini et al. | 701/206 |
| 2007/0225911 A1 | 9/2007 | Chanick | |
| 2009/0216438 A1 | 8/2009 | Shafer | 701/210 |
| 2011/0022468 A1 | 1/2011 | Muster et al. | |
| 2012/0028654 A1 | 2/2012 | Gupta et al. | |
| 2012/0066035 A1 | 3/2012 | Stanger et al. | |
| 2012/0130762 A1 | 5/2012 | Gale et al. | |

(Continued)

OTHER PUBLICATIONS

"Uniform Resource Identifier". Wikipedia <https://en.wikipedia.org/wiki/Uniform_resource_identifier>.*

(Continued)

*Primary Examiner* — Mussa A Shaawat
*Assistant Examiner* — Michael Kerrigan
(74) *Attorney, Agent, or Firm* — Bereskin & Parr LLP

(57) ABSTRACT

A facility wayfinding system is provided which includes an interactive public display device and a mobile device, running a mobile wayfinding application. The interactive public display device, which is situated at a first location within a facility, displays a facility map showing facility units, receives a user selection of a facility unit as a second location, and displays a route from the first location to the second location on the facility map. The mobile device also displays the facility map, displays a route from a start location to a destination location on the facility map, and updates the start location to the first location and the destination location to the second location by synchronizing with the interactive public display device.

17 Claims, 3 Drawing Sheets

(56) References Cited

U.S. PATENT DOCUMENTS

2012/0295632 A1    11/2012  Karlsson et al.
2015/0154643 A1*  6/2015  Artman et al. ............... 701/516

OTHER PUBLICATIONS

PCT/CA2013/000297 Search Report dated May 27, 2013.
"What goes where? Designing interactive large public display applications for mobile device interaction" by Kaviani, N., Finke, M., Fels, S., Lea, R., and Wang, H., ACM ICIMCS '09, Nov. 23-25, 2009, Kunming, Yunnan China.

* cited by examiner

FACILITY WAYFINDING SYSTEM

CROSS-REFERENCE TO RELATED APPLICATIONS

This application claims priority from U.S. Provisional Patent Application No. 61/733,078 to Liu et al., filed on Dec. 4, 2012, which is incorporated herein by reference.

TECHNICAL FIELD OF THE INVENTION

The present invention relates to wayfinding. More particularly, the present invention relates to wayfinding within a facility, i.e., facility wayfinding.

BACKGROUND OF THE INVENTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding. Typically, static physical signs and directories are used for wayfinding within facilities. Such signs and directories are expensive to update and provide limited wayfinding information.

In attempts to improve facility wayfinding, some facilities have developed stand-alone mobile wayfinding applications. However, these mobile wayfinding applications are, generally, facility-specific. Unfortunately, visitors to a facility are often reluctant to install a mobile wayfinding application useful for only that facility on their mobile devices, e.g., mobile phones. Furthermore, these mobile wayfinding applications, generally, rely on signal-based localization of the mobile device for routing. Unfortunately, localization based on signals, e.g., GPS or WiFi signals, may be inaccurate or may require an additional localization system.

Other facilities have installed stand-alone interactive public display devices, i.e., digital directories. However, these interactive public display devices are fixed at a particular location within the facility. Once visitors leave that location, they must rely on their memory or, in some instances, a printout to recall wayfinding information provided by the interactive public display device.

A facility wayfinding system including both a mobile wayfinding application and an interactive public display device is disclosed in U.S. Patent Application Publication No. 2011/0022468 to Muster et al., published on Jan. 27, 2011, which is incorporated herein by reference. The mobile wayfinding application, like previous stand-alone mobile wayfinding applications, relies on signal-based localization of the mobile device for routing. Furthermore, the interactive public display device, like previous interactive public display devices, relies on printouts to provide visitors with a record of wayfinding information. Therefore, an improved facility wayfinding system is desirable.

SUMMARY OF THE INVENTION

Accordingly, one aspect of the present invention relates to a wayfinding system for a facility including multiple facility units, the wayfinding system comprising: an interactive public display device, situated at a first location within the facility, configured to: present a public user interface on a display of the public display device; display a facility map, showing the facility units, via the public user interface; receive a user selection of a facility unit as a second location, via the public user interface; and display a route from the first location to the second location on the facility map, via the public user interface; and a mobile wayfinding application executable by a mobile device to configure the mobile device to: present a mobile user interface on a display of the mobile device; display the facility map, via the mobile user interface; display a route from a start location to a destination location on the facility map, via the mobile user interface; and update the start location to the first location and the destination location to the second location by synchronizing with the public display device.

Another aspect of the present invention relates to an interactive public display device for integration into a wayfinding system for a facility including multiple facility units, the public display device situated at a first location within the facility and comprising: a display; a processor configured to: present a public user interface on the display of the public display device; display a facility map, showing the facility units, via the public user interface; receive a user selection of a facility unit as a second location, via the public user interface; and display a route from the first location to the second location on the facility map, via the public user interface; and a synchronization feature configured to enable a mobile device to synchronize with the public display device, so that the mobile device is configured to display the route from the first location to the second location on the facility map, via a mobile user interface presented on a display of the mobile device.

Yet another aspect of the present invention relates to a mobile wayfinding application for integration into a wayfinding system for a facility including multiple facility units, the mobile wayfinding application embodied in a non-transitory computer-readable storage medium and executable by a processor of a mobile device to configure the mobile device to: present a mobile user interface on a display of the mobile device; display a facility map, showing the facility units, via the mobile user interface; display a route from a start location to a destination location on the facility map, via the mobile user interface; and update the start location to the first location and the destination location to the second location by synchronizing with an interactive public display device, wherein the public display device is situated at the first location within the facility, and wherein a selection state of the public display device includes a user selection of the second location.

BRIEF DESCRIPTION OF THE DRAWINGS

The present invention will be described in greater detail with reference to the accompanying drawings wherein.

DETAILED DESCRIPTION OF THE INVENTION

The present invention provides a wayfinding system for a facility including multiple facility units, i.e., a facility wayfinding system. The wayfinding system is not restricted to single facility, but may be extended to multiple facilities of the same type and/or different types, each including multiple facility units.

The wayfinding system allows users, e.g., visitors to the facility, to orient themselves and to navigate from place to place within the facility, enabling them to find what they are looking for and to discover things around them. For example, a shopper at a mall can use the wayfinding system to search for a particular store or a particular item, e.g., shoes, to navigate to the relevant location, and/or to look at the current promotions.

The facility may be any type of facility. Typically, the facility is a commercial facility or an institutional facility. For example, the facility may be a retail facility, e.g., a mall or a shopping center, an office facility, e.g., an office building, an event facility, e.g., a conference center or a theme park, a transportation facility, e.g., an airport, an educational facility, e.g., a school or a university campus, or a medical facility, e.g., a hospital. The facility may be an indoor or an outdoor facility. However, the wayfinding system is particularly useful for indoor facilities.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

Figure 1:
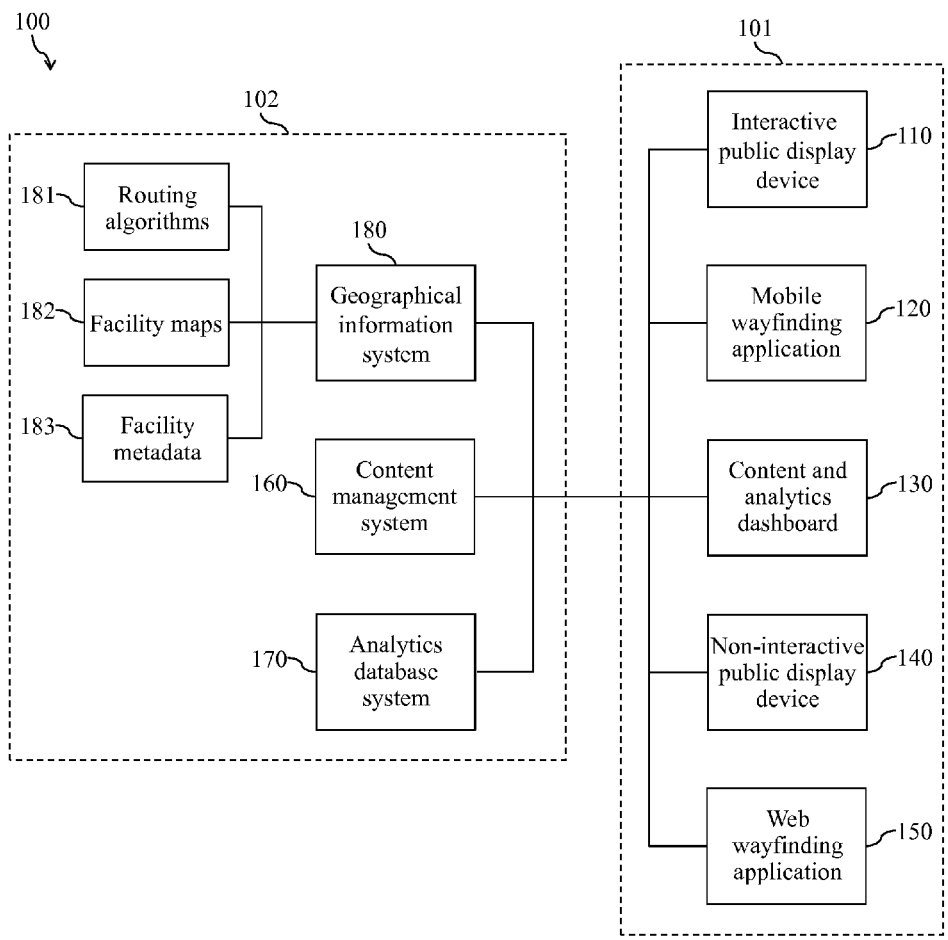
FIG. 1 is a block diagram of an exemplary embodiment of a facility wayfinding system according to the present invention.

With reference to FIG. 1, an exemplary embodiment of the wayfinding system 100 includes a variety of user-facing components 101 all supported by a common backend system 102. Advantageously, by using a common backend system 102 for all the user-facing components 101, system speed is increased and infrastructure costs are reduced. The user-facing components 101 and the backend system 102 are operatively connected, typically, via the Internet. The individual connections may be wired or wireless connections.

Preferably, the user-facing components 101 and the backend system 102 communicate asynchronously, for example, by using an implementation of the WebSocket protocol, such as Socket.IO. Updates are, preferably, sent from the backend system 102 to each of the user-facing components 101 in real time as interrupts, i.e., without polling. Likewise, user interaction data is, preferably, sent from each of the user-facing components 101 to the backend system 102 in real time as interrupts, i.e., without polling.

The user-facing components 101 include an interactive public display device 110, i.e., a digital directory, a mobile wayfinding application 120, a content and analytics dashboard 130, a non-interactive public display device 140, i.e., a digital sign, and a web wayfinding application 150. Although a single instance of each of the user-facing components 101 is illustrated in FIG. 1, the wayfinding system 100 may include multiple instances of each of the user-facing components 101. The backend system 102 includes a content management system (CMS) 160, an analytics database system 170, and a geographical information system (GIS) 180.

Note that other embodiments may omit some of these components or systems and/or include additional components or systems. The wayfinding system 100 is customizable for the type of facility. Different types of facilities have different needs, and the wayfinding system 100 may be customized to suit those needs. Each of the user-facing components 101 may be customized in terms of the appearance of the user interfaces and the types of information displayed via the user interfaces. For example, for a convention center, a consistent color theme may be selected for the user interfaces, and background information about speakers and/or seminar information may be displayed.

In general, the interactive public display device 110 and the non-interactive public display device 140 each include a processor, memory, and a network interface card. These devices, specifically, the processors thereof, are configured by applications mentioned hereafter to execute the actions described hereafter. In general, the mobile wayfinding application 120, the content and analytics dashboard 130, the CMS 160, the analytics database system 170, and the GIS 180 each run on devices including a processor, memory, and a network interface card, and thereby, configure the devices, specifically, the processors thereof, to execute the actions described hereafter. The applications are, generally, embodied in non-transitory computer-readable storage media, typically, device memories, and are executable by device processors.

The interactive public display device 110 is situated at a particular location within the facility. Typically, the interactive public display device 110 is fixed or mounted at the particular location. Preferably, the interactive public display device 110 is provided with an identifier, e.g., a serial number, which uniquely identifies the interactive public display device 110 among multiple interactive public display devices 110 situated at different locations within the same and/or different facilities.

The interactive public display device 110 may have a variety of designs depending on its location. For example, the interactive public display device 110 may have a freestanding kiosk design or a wall-mounted design. In addition to a processor, memory, and a network interface card, the interactive public display device 110 includes a display and, preferably, a synchronization feature.

The display of the interactive public display device 110 is a large-screen display adapted for public viewing. For example, the display may have a diagonal screen size of greater than 30" (76 cm). Typically, the display is a touch-screen display, e.g., a capacitive touch-screen display. For example, the display may be a liquid crystal display (LCD) with an integrated or separate touch-sensing mechanism. In some instances, the interactive public display device 110 may include a separate input device, e.g., a touchpad, one or more keys, and/or a keyboard, in addition to or instead of a touch-screen display.

The synchronization feature is, typically, an external, scannable, i.e., machine-readable, feature. For example, the synchronization feature may be a quick response (QR) code or a near-field communication (NFC) tag. A QR code may be printed on a sticker or other medium and attached to the interactive public display device 110, or may be printed or painted directly on the interactive public display device 110. An NFC tag, which is, typically, made of a conductive material such as copper, may be embedded in a sticker or other medium and attached to the surface of the interactive public display device 110, or may be embedded directly into the interactive public display device 110. In some instances, the interactive public display device 110 may include multiple synchronization features of different types. For example, the interactive public display device 110 may include both a QR code and an NFC tag, disposed separately from one another on the interactive public display device 110 or disposed on top of one another on the interactive public display device 110.

The synchronization feature is configured to enable a mobile device, running the mobile wayfinding application 120, to synchronize with the interactive public display device 110, typically, by scanning the synchronization feature. Preferably, the synchronization feature is encoded with the identifier of the interactive public display device 110.

For example, the identifier may be included in a unique uniform resource locator (URL) corresponding to the interactive public display device 110. When synchronized from the operating system of the mobile device, e.g., by using a QR reader application or a built-in NFC reader, the URL directs to the appropriate download page for the mobile wayfinding application 120, e.g., an application or "app" store. When synchronized from within the mobile wayfinding application 120, e.g., by using an in-app reader/scanner, the mobile wayfinding application 120 loads the state of the interactive public display device 110 through the backend system 102 by referencing the unique URL.

Figures 2, 3:
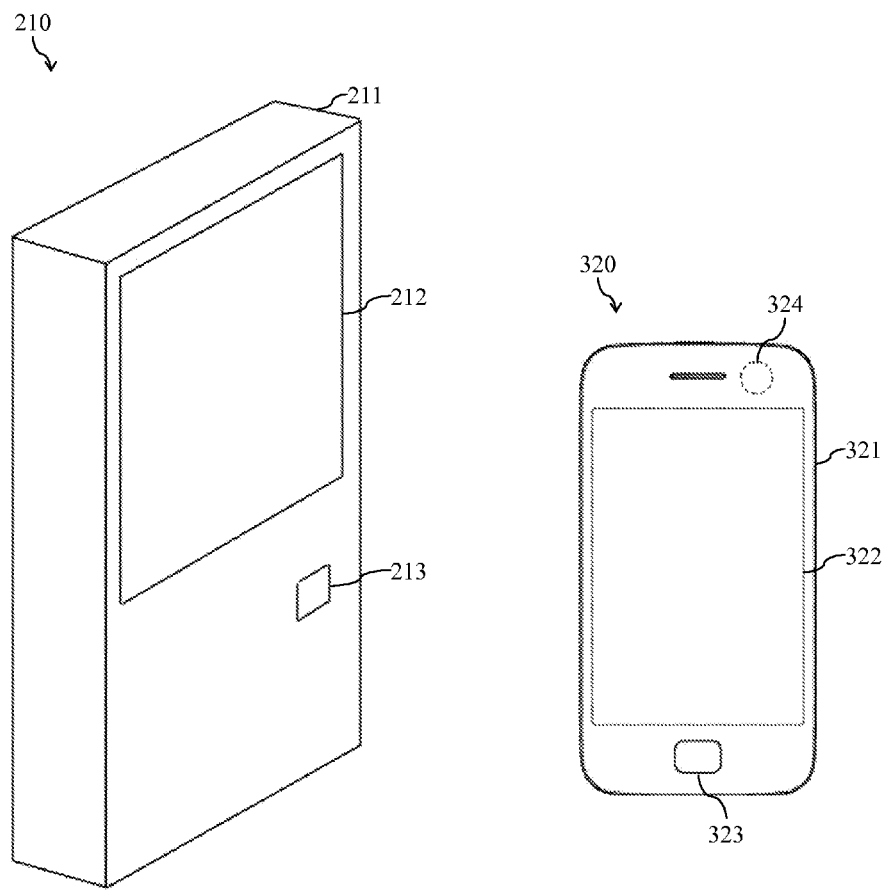
FIG. 2 is a schematic illustration of an exemplary embodiment of an interactive public display device according to the present invention.
FIG. 3 is a schematic illustration of an exemplary embodiment of a prior-art mobile device for running a mobile wayfinding application according to the present invention.

With reference to FIG. 2, an exemplary embodiment of the interactive public display device 210 is designed as a free-standing kiosk. The interactive public display device 210 includes an enclosure 211, i.e., a housing, a touch-screen display 212 supported by the enclosure 211, a synchronization feature 213 on the enclosure 211, as well as a processor (not shown), memory (not shown), and a network interface card (not shown) within the enclosure 211. In the illustrated embodiment, the touch-screen display 212 has a substantially vertical orientation, which allows an additional display to be included on an opposite side of the interactive public display device 210. In other words, a non-interactive public display device may be integrated with the interactive public display device 210.

With reference again to FIG. 1, the interactive public display device 110 runs a public wayfinding application, which may be a web application running in a web browser and hosted by the backend system 102 or a native application stored in the memory of the interactive public display device 110. The interactive public display device 110, running the public wayfinding application, presents a public user interface, which is adapted for simultaneous viewing by multiple users, on its display. The interactive public display device 110 displays information relating to the facility and the facility units, including wayfinding information, via the public user interface, and receives user requests for such information via the public user interface.

The wayfinding information that is displayed includes a facility map 182 showing the facility units. The facility map 182 illustrates the layout of the facility units within the facility, facilitating navigation through the facility. The wayfinding information also includes routes from a start location to a destination location on the facility map 182 and, optionally, corresponding directions. Typically, the wayfinding information further includes a facility directory listing the facility units. The facility directory lists the facility units by name in an organized manner, e.g., alphabetically, by category, and/or by location.

The representation of the wayfinding information in the public user interface is optimized for public viewing. Typically, the whole facility map 182 or a complete floor of the facility map 182, i.e., a floor map, is displayed on a single screen of the public user interface. When the facility has more than one floor, the public user interface may cycle through multiple floor maps over time. Preferably, a whole facility map 182 or floor map is always displayed, even while a user is interacting with the interactive public display device 110, so that other users may use the map for navigation.

Typically, the whole facility directory or a complete category of the facility directory, i.e., a directory category, is displayed on the same screen of the public user interface. When the directory is organized by category, the public user interface may cycle through multiple directory categories over time. Preferably, a whole facility directory or directory category is always displayed, even while a user is interacting with the interactive public display device 110, so that other users may use the directory for navigation. Also preferably, the facility units are labeled with an identifier on the facility map 182 and listed with the same identifier in the facility directory.

A user request for wayfinding information involves a user selection of a facility unit as a destination location, via the public user interface. Typically, the user selection of a facility unit as a destination location is received by detecting a user touch on a facility unit on the facility map 182, i.e., an interactive facility map 182, or in the facility directory, i.e., an interactive facility directory, displayed on a touch-screen display. Alternatively, the user selection may be received from a separate input device, e.g., a touchpad, one or more keys, and/or a keyboard. The facility unit selected as the destination location is highlighted on the facility map 182, and a route from the interactive public display device 110, as the start location, to the facility unit selected as the destination location is displayed on the facility map 182.

Optionally, corresponding point-to-point directions may be displayed along with more detailed map views on the same screen of the public user interface. Typically, additional information relating to the facility unit selected as the destination location is also displayed, such as a profile, a photograph, directory information, e.g., a phone number and/or an address, opening hours, event information, promotional information, e.g., an advertisement and/or a marketing message, and/or a promotional item, e.g., a digital coupon.

In some instances, a user selection of a directory category may also be received. Typically, the user selection of a directory category is received by detecting a user touch on a heading of the facility directory. Alternatively, the user selection may be received from a separate input device, e.g., a touchpad, one or more keys, and/or a keyboard. When a directory category is selected, those facility units categorized as belonging to that directory category are displayed. For example, a user may select the directory category "shoes", and those facility units categorized as shoe stores may be displayed.

Accordingly, the public user interface has a selection state including a user selection of a destination location and, in some instances, a user selection of a directory category. Preferably, the public user interface has a selection state including at most two user selections, i.e., at most two layers of statefulness relating to user selections.

The interactive public display device 110 may also display real-time notifications, e.g., notifications of events, notifications of promotions, and/or alerts.

The non-interactive public display device 140 is physically similar to the interactive public display device 110, but lacks user interactivity. In general, the non-interactive public display device 140 includes a non-touch display, e.g., a standard LCD display. The non-interactive public display device 140 may be installed as a free-standing unit or may be integrated with the interactive public display device 110. For example, a non-interactive public display device 140 may be integrated with the interactive public display device 210 of FIG. 2, sharing the same enclosure 211, processor, memory, and network interface card. The non-interactive public display device 140 displays wayfinding and/or promotional information, typically, a static facility map 182, a static facility directory, and/or an advertisement.

Like the interactive public display device 110, preferably, the non-interactive public display device 140 is provided with an identifier which uniquely identifies the interactive public display device 140, and includes a synchronization feature encoded with the identifier, e.g., a QR code or an NFC tag referencing the physical location of the non-interactive public display device 140.

The mobile wayfinding application 120 runs on a mobile device, which is a hand-held, portable computer device, such as a mobile phone, e.g., a smartphone, a personal digital assistant (PDA), or a tablet computer. In addition to a processor, memory, and a network interface card, the mobile device includes a display and, preferably, also includes a synchronization device.

The display of the mobile device is a small-screen display adapted for personal viewing. For example, the display may have a diagonal screen size of less than 15" (38 cm). Typically, the display is a touch-screen display. In some instances, the mobile device may include a separate input device, e.g., a touchpad, one or more keys, and/or a keyboard, in addition to or instead of a touch-screen display.

Typically, the synchronization device is a scanning, i.e., reading, device, and the mobile device is configured to scan the synchronization feature, in order to read the synchronization feature. For example, the synchronization device may be a camera, an NFC transceiver, a Bluetooth transceiver, or a WiFi transceiver. In some instances, the mobile device may include multiple synchronization devices of different types. For example, the mobile device may include both a camera and an NFC transceiver.

With reference to FIG. 3, an exemplary embodiment of the mobile device 320 is a conventional smartphone. The mobile device 320 includes a housing 321, a touch-screen display 322 supported by the housing 321, and a home key 323 on the housing 321, as well as a processor (not shown), memory (not shown), a network interface card (not shown), and a synchronization device 324, e.g., an NFC transceiver, within the housing 321.

With reference again to FIG. 1, the mobile wayfinding application 120 is, typically, a native application stored in the memory of the mobile device and running in the operating system of the mobile device. In general, different versions of the mobile wayfinding application 120 are written for different mobile platforms, in the appropriate languages, using the appropriate software development kits (SDKs) and frameworks.

The mobile device, running the mobile wayfinding application 120, presents a mobile user interface, which is adapted for viewing by a single user, on its display. The mobile user interface and the public user interface have similar appearances, functions, and features, so that users are able to easily transition between the user interfaces. The mobile device displays information relating to the facility and the facility units, including wayfinding information, via the mobile user interface, and receives user requests for such information via the mobile user interface.

The wayfinding information that is displayed via the mobile user interface on the mobile device is, generally, the same as that displayed via the public user interface on the interactive public display device 110, but the representation of the wayfinding information in the mobile user interface is optimized for personal viewing on a small-screen display, rather than public viewing on a large-screen display. The mobile user interface offers additional content, and additional levels of screens, menus, and interactions.

Typically, a list of multiple facilities is displayed on an initial screen of the mobile user interface. A user selection of a facility is received by detecting a user touch on a touch-screen display or from a separate input device. A facility map 182, a facility directory, and facility events associated with the selected facility may then be accessed.

Typically, the facility map 182 or a portion thereof is displayed on a single screen of the mobile user interface, and the facility map 182 may be manipulated through finger gestures. For example, the facility map 182 may be moved by a single-finger gesture, or magnified or reduced by a two-finger gesture. Preferably, the facility units are displayed with markers, which allow a user selection of a facility unit to be made by a single-tap gesture on the corresponding marker. Typically, the facility directory or a portion thereof is displayed on a different screen of the mobile user interface, and the facility directory may be manipulated through finger gestures. For example, the facility directory may be scrolled by a single-finger gesture.

A user request for wayfinding information involves a user selection of a facility unit as a destination location, via the mobile user interface. Typically, the user selection of a facility unit as a destination location is received by detecting a user touch on a facility unit on the facility map 182 or in the facility directory displayed on a touch-screen display. Alternatively, the user selection may be received from a separate input device, e.g., a touchpad, one or more keys, and/or a keyboard. The facility unit selected as the destination location is highlighted on the facility map 182.

Typically, additional information relating to the facility unit selected as the destination location is also displayed, such as a profile, a link to a webpage or a social media page, a photograph, directory information, e.g., a phone number and/or an address, opening hours, event information, promotional information, e.g., an advertisement and/or a marketing message, and/or a promotional item, e.g., a digital coupon. Additionally, information generated by other people, e.g., friends on social media sites, or friends from within the mobile wayfinding application 120, may be displayed in the mobile user interface. Preferably, each facility unit has its own profile page where the additional information may be accessed.

For routing to the facility unit selected as the destination location without synchronizing the mobile device, a user selection of a facility unit as a start location is also received, via the mobile user interface. Typically, the user selection of a facility unit as a start location is received by detecting a user touch on a facility unit in the facility directory displayed on a touch-screen display or by searching for an alphanumeric string, e.g., by using a real-time intelligent search, input from an on-screen or physical keyboard. A route from the facility unit selected as the start location to the facility unit selected as the destination location is then displayed on the facility map 182. Optionally, corresponding point-to-point directions may also be displayed. For example, the point-to-point directions may accessed by sliding between points on a progress bar displayed below the facility map 182. As each point is reached, a corresponding step is illustrated on the facility map 182 and also displayed as text.

Preferably, the wayfinding system 100 allows a user to synchronize or "sync" their mobile device, running the mobile wayfinding application 120, with the interactive public display device 110. For example, a user may use a synchronization device on their mobile phone to interface with a synchronization feature on the interactive public display device 110. Preferably, the mobile wayfinding application 120 includes an in-app reader/scanner.

Upon synchronization, the start location is updated to the interactive public display device 110, and the destination location is updated to a facility unit selected on the interactive public display device 110. In general, the selection state of the mobile wayfinding application 120 is updated to the selection state of the interactive public display device 110. In other words, the mobile wayfinding application 120 reflects what is displayed and selected on the interactive public display device 110. Thus, advantageously, the mobile wayfinding application 120 does not have to rely on signal-based localization of the mobile device for routing and does not have to rely on printouts to provide a record of wayfinding information. For example, if a shopper at a mall uses the interactive public display device 110 to select a particular store, and to obtain a route to the store and other relevant information about the store, the shopper can synchronize their mobile phone with the interactive public display device 110 to load the same route and information into the mobile wayfinding application 120. Optionally, upon synchronization, the mobile device may also receive a promotional item, e.g., a digital coupon, displayed on the interactive public display device 110.

In some instances, the mobile device, running the mobile wayfinding application 120, may be synchronized with the non-interactive public display device 140 in a similar manner to update the start location to the non-interactive public display device 140.

Figure 4:
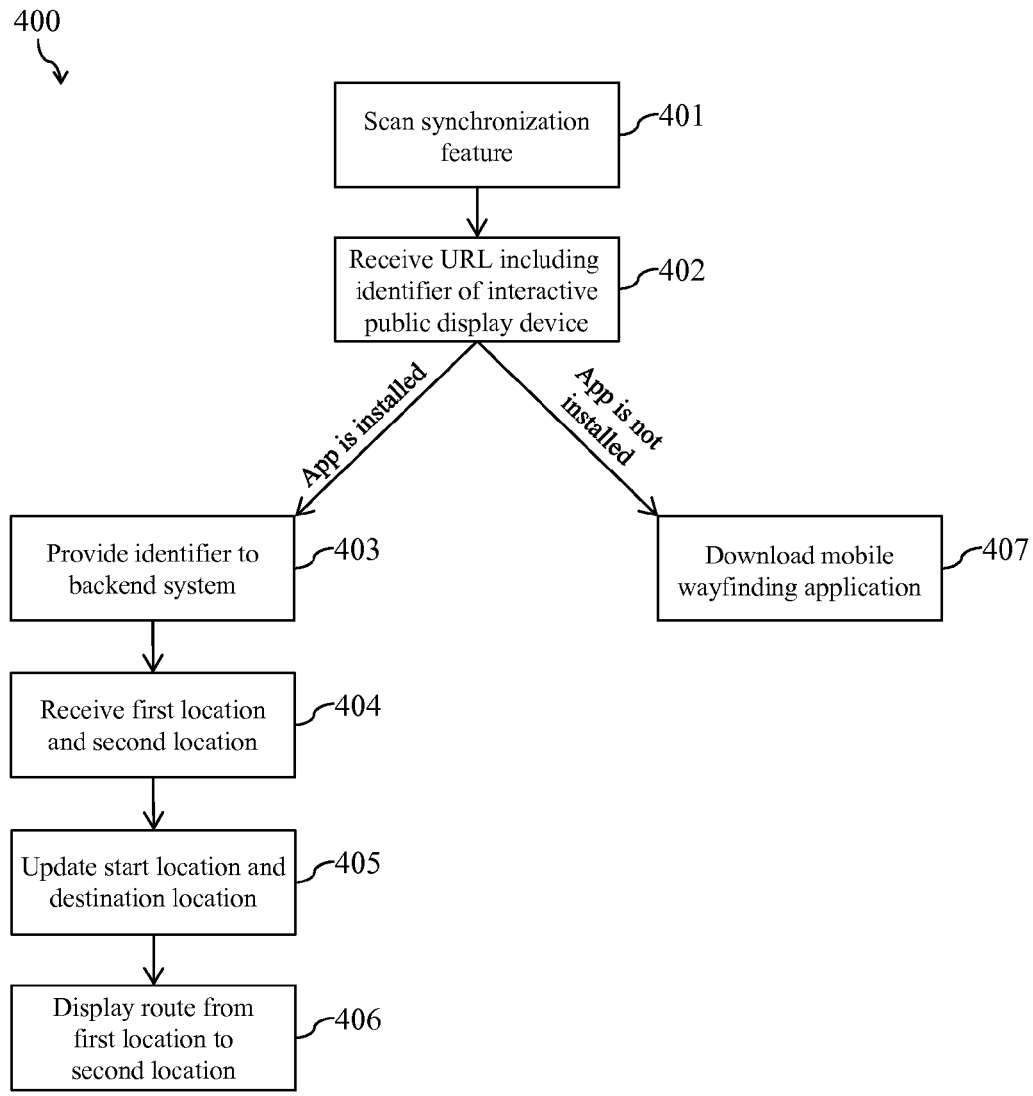
FIG. 4 is flow diagram of an exemplary embodiment of a synchronization method according to the present invention.

With reference to FIG. 4, in an exemplary embodiment of a synchronization method 400, a mobile device scans a scannable synchronization feature on an interactive public display device, by means of a scanning device, in a first step 401. The interactive public display device is located at a first location within a facility and has been used to select a facility unit as a second location, i.e., has a current selection state including a user selection of the second location. Accordingly, the interactive public display device displays a route from the first location to the second location, via the public user interface. In a second step 402, the mobile device receives a unique URL including an identifier of the interactive public display device.

If the mobile device already has the mobile wayfinding application installed, the mobile device provides the identifier to the backend system, via the URL, in a third step 403. In return, the mobile device receives the first location and the second location from the backend system, in a fourth step 404. In a fifth step 405, the mobile device updates its start location to the first location and its destination location to the second location in the mobile wayfinding application. Accordingly, the mobile device displays the route from the first location to the second location, via the mobile user interface, in a sixth step 406.

If the mobile device does not have the mobile wayfinding application 120 installed, the URL directs the mobile device to download the mobile wayfinding application 120 from an application store, in an alternative step 407.

The mobile device may also display real-time notifications, e.g., notifications of events, notifications of promotions, and/or alerts.

With reference again to FIG. 1, the web wayfinding application 150 runs in a web browser on a computer device, e.g., a desktop computer or laptop computer, and is hosted by the backend system 102. The web wayfinding application 150 is, generally, similar to the mobile wayfinding application 120, but is designed for a standard computer device, rather than a mobile device. Accordingly, the representation of the wayfinding information is optimized for personal viewing on a standard-screen non-touch display. User selections are received from an input device, e.g., a mouse or a keyboard.

The content and analytics dashboard 130 is, typically, a web application running in a web browser on a computer device, e.g., a desktop computer or laptop computer, and hosted by the backend system 102. The content and analytics dashboard 130 is a management application, which allows authorized users, e.g., facility managers, to manage and administer the wayfinding system 100. Advantageously, by using the content and analytics dashboard 130, authorized users are able to manage and administer all of the user-facing components 101 in one place and at the same time.

The content and analytics dashboard 130 includes a content module, which enables authorized users to update content stored in the CMS 160 in the backend system 102. Information relating to the facility and the facility units can easily be accessed and changed, e.g., revised, added, or removed. Updates are pushed to the interactive public display device 110, the mobile wayfinding application 120, and the web wayfinding application 150 in real time. For example, a hospital administrator may use the content and analytics dashboard 130 to update contact information for a hospital department on all interactive public display devices 110 situated within the hospital and on all versions of the mobile wayfinding application 120.

The content and analytics dashboard 130 also includes an analytics module, which enables authorized users to receive and view analytics from the analytics database system 170 in the backend system 102. Analytics relating to user interactions with the interactive public display device 110, the mobile wayfinding application 120, and the web wayfinding application 150, e.g., user selections or "hits", searches, dates, types of mobile device, and/or movement patterns represented as heat maps, may be accessed and viewed in real time. In particular, heat maps may be generated manually within the analytics database system 170 or by the GIS 180, by plotting individual paths taken by each user and overlaying color values onto the plot based on the number of overlayed paths.

Typically, the analytics describe and compare user interactions by facility unit, e.g., hits per facility unit, or by directory category, e.g., hits per category, over a particular time period, e.g., in tables, charts, and/or graphs. The analytics may be received in the form of a report, e.g., a monthly report or an on-demand report. For example, a hospital administrator may use the content and analytics dashboard 130 to view heat maps of visitor/patient movement. For another example, a mall manager may use the content and analytics dashboard 130 to query how many shoppers selected a particular store or searched for washrooms by using a particular type of mobile device over a particular time period.

The backend system 102, typically, includes multiple backend devices, e.g., servers. Typically, the backend system 102 includes at least a database server and a hosting server. In some instances, the backend system 102 also includes a content distribution network (CDN). The CMS 160 and the analytics database system 170 are hosted by the backend system 102. The GIS 180 may be hosted internally by the backend system 102 or supplied externally.

The CMS 160 is a database application, typically, implemented as a web service. The CMS 160 stores content, including information relating to the facility and the facility units, handles updates to the content received from the content and analytics dashboard 130, and provides the content to the interactive public display device 110, the mobile wayfinding application 120, and the web wayfinding application 150. For example, the CMS 160 may be a no structured query language (NoSQL) database application. The content stored in the CMS 160 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 183 stored in the GIS 180. This allows larger, less frequently accessed files to be stored in the CMS 160, rather than the GIS 180.

The CMS 160 also stores the identifier of the interactive public display device 110 together with the location of the interactive public display device 110, and the current selection state of the interactive public display device 110. Typically, the CMS 160 stores identifiers, locations, and current selection states for multiple interactive public display devices 110. In some instances, the CMS 160 also stores identifiers and locations for multiple non-interactive public display devices 140.

When a mobile device, running the mobile wayfinding application 120, sends an identifier of an interactive public display device 110 to the backend system 102 upon synchronization with that interactive public display device 110, the identifier is received by the CMS 160. The CMS 160 uses the identifier to identify the interactive public display device 110, typically, among the multiple interactive public display devices, and to retrieve the location and the current selection state for the interactive public display device 110. The CMS 160 then provides the location and the current selection state of the interactive public display device 110 to the mobile device, which updates its location and selection state accordingly. Typically, the selection state includes a user selection of a destination location.

The analytics database system 170 is also a database application, typically, implemented as a web service. The analytics database system 170 stores all user interactions with the interactive public display device 110, the mobile wayfinding application 120, and the web wayfinding application 150, e.g., user selections or "hits", searches, dates, types of mobile device, and/or movement patterns represented as heat maps, in real time, and generates analytics relating to the user interactions. Advantageously, because user interactions are recorded for several different user-facing components 101, a relatively large sample size is obtained. Typically, user interactions are stored in a raw format and preset metrics are passively generated. For example, all hits on the interactive public display device 110 and the mobile wayfinding application 120 at a mall may be recorded, and a table listing the number of hits per store in the current month may be generated, for viewing in the content and analytics dashboard 130.

The GIS 180 is, typically, a representational state transfer (REST)-ful application programming interface (API). The GIS 180 includes routing algorithms 181, facility maps 182, and associated facility metadata 183. The GIS 180 stores the facility maps 182 and the facility metadata 183, handles updates to the facility maps 182 and the facility metadata 183, and provides the facility maps 182 and the facility metadata 183 to the interactive public display device 110, the mobile wayfinding application 120, and the web wayfinding application 150. Typically, the GIS 180 serves the facility maps 182, e.g., as PNG files, and the facility metadata 183, e.g., as JSON/XML files, over the web. The facility metadata 183 is customizable for the type of facility, and may include digital representations of paths, polygons encapsulating facility units, nodes corresponding to facility locations, identifiers for each facility unit, and qualitative metadata 183, such as the type of path, e.g., hallway or dirt trail.

The GIS 180 also uses the routing algorithms 181 to calculate routes and provides the routes to the interactive public display device 110, the mobile wayfinding application 120, and the web wayfinding application 150. Typically, the routing calculations output a JSON/XML list of node or polygon identifiers representing a complete path, which the interactive public display device 110, the mobile wayfinding application 120, and the web wayfinding application 150 will interpret and display. The output may also include points of interest and other metadata 183, such as total estimated travel time based on type of path and real-time traffic.

Of course, numerous other embodiments may be envisaged without departing from the spirit and scope of the invention.

We claim:

1. A wayfinding system for a facility including multiple facility units, the wayfinding system comprising:
    an interactive public display device, situated at a first location within the facility, configured to:
        present a public user interface on a display of the public display device;
        display a facility map, showing the facility units, via the public user interface;
        receive a user selection of a facility unit as a second location, via the public user interface;
        display a route from the first location to the second location on the facility map, via the public user interface; and
        present a scannable synchronization feature encoded with a uniform resource locator (URL) comprising an identifier associated with the route and the public display device, wherein the synchronization feature is at least one of a quick response (QR) code and a near-field communication (NFC) tag; and
    a mobile device configured to:
        present a mobile user interface on a display of the mobile device;
        scan the synchronization feature to receive the URL;
        via the URL, provide the identifier to a backend system;
        obtain, from the backend system, the first location and the second location selected at the public display device;
        update the start location to the first location and the destination location to the second location;
        display the facility map, via the mobile user interface; and
        display the route from a start location to a destination location on the facility map, via the mobile user interface.

2. The wayfinding system of claim 1, wherein the facility is an indoor facility.

3. The wayfinding system of claim 1, wherein the public display device is further configured to display a promotional item relating to the selected facility unit, via the public user interface; and wherein the mobile device is further configured to receive the promotional item by synchronizing with the public display device.

4. The wayfinding system of claim 1, further comprising:
the backend system, wirelessly connected to the public display device and the mobile device, configured to:
provide the facility map to the public display device and the mobile device;
provide the route from the first location to the second location to the public display device; and
provide the route from the start location to the destination location to the mobile device.

5. The wayfinding system of claim 4, wherein the public display device includes the synchronization feature configured to enable the mobile device to synchronize with the public display device by scanning the synchronization feature; and wherein the mobile device includes a scanning device configured to scan the synchronization feature.

6. The wayfinding system of claim 5, wherein the backend system is further configured to store identifiers, locations, and current selection states for the multiple interactive public display devices.

7. The wayfinding system of claim 5, wherein the synchronization feature is further encoded with an instruction directing the mobile device to provide the identifier to the backend system upon synchronization; and
wherein the backend system is further configured to provide the first location and the second location to the mobile device upon receipt of the identifier.

8. The wayfinding system of claim 7, wherein the backend system is further configured to:
store identifiers, locations, and current selection states for the multiple interactive public display devices; and
use the identifier to identify the public display device among the multiple interactive public display devices, and to retrieve the location and the current selection state for the public display device, wherein the location is the first location, and the current selection state includes the user selection of the second location.

9. The wayfinding system of claim 4, further comprising:
a geographical information system (GIS), hosted internally by the backend system or supplied externally to the backend system, configured to:
store the facility map and associated facility metadata; and
the destination location.

10. The wayfinding system of claim 4, wherein the public display device is further configured to display a facility directory, listing the facility units, via the public user interface;
wherein the mobile device is further configured to display the facility directory, via the mobile user interface; and
wherein the backend system is further configured to provide the facility directory to the public display device and the mobile device.

11. The wayfinding system of claim 10, wherein the public display device is configured to display the facility map and the facility directory on a same screen of the public user interface; and wherein the mobile device is configured to display the facility map and the facility directory on different screens of the mobile user interface.

12. The wayfinding system of claim 10, wherein the display of the public display device is a touch-screen display; and wherein the public display device is configured to receive the user selection by detecting a user touch on a facility unit on the facility map or in the facility directory.

13. The wayfinding system of claim 1, wherein the identifier uniquely identifies the public display device among multiple interactive public display devices.

14. An interactive public display device for integration into a wayfinding system for a facility including multiple facility units, the public display device situated at a first location within the facility and comprising:
a display;
a processor configured to:
present a public user interface on the display of the public display device;
display a facility map, showing the facility units, via the public user interface;
receive a user selection of a facility unit as a second location, via the public user interface; and
display a route from the first location to the second location on the facility map, via the public user interface; and
present a scannable synchronization feature encoded with a uniform resource locator (URL) comprising an identifier associated with the route and the public display device, configured to enable a mobile device to scan the synchronization feature to receive the URL and provide the identifier to a backend system via the URL and obtain, from the backend system, the first location and the second location selected at the public display device; and to display the route from the first location to the second location on the facility map, via a mobile user interface presented on a display of the mobile device;
wherein the synchronization feature is at least one of a quick response (QR) code and a near-field communication (NFC) tag.

15. The interactive public display device of claim 14, wherein the synchronization feature is encoded with an instruction directing the mobile device to provide the identifier to a backend system upon synchronization, wherein the backend system is wirelessly connected to the public display device and the mobile device; and
wherein the backend system is configured to provide the first location and the second location to the mobile device upon receipt of the identifier.

16. A non-transitory computer-readable storage medium having stored thereon computer-executable instructions that, when executed by a processor of a mobile device, cause the processor of a mobile device to execute a mobile wayfinding application for integration into a wayfinding system for a facility including multiple facility units, wherein the mobile wayfinding application causes the mobile device to:
present a mobile user interface on a display of the mobile device;
display a facility map, showing the facility units, via the mobile user interface;
display a route from a start location to a destination location on the facility map, via the mobile user interface;
scan a scannable synchronization feature to receive a uniform resource locator (URL), the synchronization feature encoded with the URL comprising an identifier associated with the route and a public display device to synchronize with the public display device to obtain, from a backend system, a first location and a second location, wherein the public display device is situated at the first location within the facility, and the second location comprises a location of a facility unit selected by a user via a public user interface of the public display device, wherein the synchronization feature is at least one of a quick response (QR) code and a near-field communication (NFC) tag; and update the start location to the first location and the destination location to the second location by synchronizing with an interactive public display device.

17. The non-transitory computer-readable medium of claim 16, wherein the synchronization feature is encoded with an instruction directing the mobile device to provide the identifier to a backend system upon synchronization, wherein the backend system is wirelessly connected to the public display device and the mobile device; and wherein the backend system is configured to provide the first location and the second location to the mobile device upon receipt of the identifier.

* * * * *